(12) United States Patent
Lee (10) Patent No.: US 9,310,996 B2
(45) Date of Patent: Apr. 12, 2016

(54) MOBILE TERMINAL AND METHOD FOR PROVIDING USER INTERFACE THEREOF

(75) Inventor: Taehoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 13/570,060

(22) Filed: Aug. 8, 2012

(65) Prior Publication Data

US 2013/0088442 A1 Apr. 11, 2013

(30) Foreign Application Priority Data

Oct. 6, 2011 (KR) .......................... 10-2011-0102091

(51) Int. Cl.
| | | |
|---|---|---|
| G06F 3/041 | (2006.01) | |
| G06F 3/0488 | (2013.01) | |
| H04M 1/67 | (2006.01) | |
| G06F 21/36 | (2013.01) | |
| G06F 3/0481 | (2013.01) | |
| G06F 3/01 | (2006.01) | |
| G06F 3/048 | (2013.01) | |

(52) U.S. Cl.
CPC ............ G06F 3/04883 (2013.01); G06F 21/36 (2013.01); H04M 1/67 (2013.01); *G06F 3/017* (2013.01); *G06F 3/048* (2013.01); *G06F 3/0481* (2013.01); *G06F 3/04817* (2013.01); *H04M 2250/22* (2013.01)

(58) Field of Classification Search
USPC .......... 713/155, 168, 182, 183; 345/173, 179, 345/156; 715/863
See application file for complete search history.

(56) References Cited

U.S. PATENT DOCUMENTS

| | | | | |
|---|---|---|---|---|
| 8,174,503 | B2 * | 5/2012 | Chin .............................. | 345/173 |
| 8,390,585 | B2 * | 3/2013 | Hyun ............................ | 345/173 |
| 8,504,842 | B1 * | 8/2013 | Meacham ...................... | 713/183 |
| 2007/0150842 | A1 * | 6/2007 | Chaudhri et al. ............. | 715/863 |
| 2009/0289916 | A1 * | 11/2009 | Dai ................................ | 345/173 |
| 2010/0127998 | A1 * | 5/2010 | Hyun ............................ | 345/173 |
| 2010/0162182 | A1 * | 6/2010 | Oh et al. ........................ | 715/863 |
| 2010/0306693 | A1 * | 12/2010 | Brinda .................. | G06F 3/0488 715/784 |
| 2010/0306718 | A1 | 12/2010 | Shim et al. | |
| 2011/0279384 | A1 * | 11/2011 | Miller et al. .................. | 345/173 |
| 2011/0316797 | A1 * | 12/2011 | Johansson ..................... | 345/173 |
| 2012/0053887 | A1 * | 3/2012 | Nurmi .................. | G06F 3/0485 702/150 |
| 2012/0084734 | A1 * | 4/2012 | Wilairat ........................ | 715/863 |

FOREIGN PATENT DOCUMENTS

| | | |
|---|---|---|
| KR | 10-2010-0073743 A | 7/2010 |
| KR | 10-2010-0086264 A | 7/2010 |
| KR | 10-2010-0127525 A | 12/2010 |
| KR | 10-2011-0016107 A | 2/2011 |

\* cited by examiner

*Primary Examiner* — Linh N Hoffner (74) *Attorney, Agent, or Firm* — Birch, Stewart, Kolasch & Birch, LLP (57) ABSTRACT

A mobile terminal including a wireless communication unit configured to wirelessly communicate with at least one other terminal; a display unit including a touch screen; a sensing unit configured to sense a touch input pattern on the display unit when the display unit is in a lock mode and displaying a lock screen; and a controller configured to detect at least a first code from the touch input pattern, said first code corresponding to at least a first portion of the touch input pattern, change the lock screen into a first screen on the display unit that is preset based on the detected first code, and release the lock mode with the first screen displayed when the sensing unit no longer senses the touch input pattern on the display unit.

14 Claims, 11 Drawing Sheets

MOBILE TERMINAL AND METHOD FOR PROVIDING USER INTERFACE THEREOF

CROSS-REFERENCE TO RELATED APPLICATIONS

Pursuant to 35 U.S.C. §119(a), this application claims the benefit of earlier filing date and right of priority to Korean application no. 10-2011-0102091, filed on Oct. 6, 2011, the contents of which is incorporated by reference herein in its entirety.

BACKGROUND OF THE INVENTION

1. Field of the Invention

This specification relates to a mobile terminal, and particularly, to a mobile terminal sensitive to touch and a method for providing user interfaces thereof

2. Background of the Invention

Terminals may be divided into mobile/portable terminals and stationary terminals. Also, the portable terminals may be categorized into a handheld terminal and a vehicle mount terminal.

As it becomes multifunctional, the terminal can be used to capture still images or moving images, play music or video files, play games, receive broadcast and the like, so as to be implemented as an integrated multimedia player.

Various attempts have been done for the terminals by hardware or software in order to implement such complicated functions.

For example, in order to prevent a touch input unexpected by a user, the mobile terminal can execute a lock mode for receiving a limited user input. In this lock mode, a preset lock screen may be displayed.

SUMMARY OF THE INVENTION

Therefore, an aspect of the detailed description is to provide a user interface in a mobile terminal capable of selectively executing a control mode desired by a user upon release of a lock mode.

To achieve these and other advantages and in accordance with the purpose of this specification, as embodied and broadly described herein, there is provided a mobile terminal including a display unit, a sensing unit configured to sense a touch input in a lock mode for restricting the touch input applied onto the display unit, a detecting unit configured to detect at least one code from the touch input, and a controller configured to set a screen of the display unit based on the detected at least one code, and release the lock mode with the set screen displayed when the touch input is not sensed any more.

In accordance with one exemplary embodiment, the controller may set a first screen corresponding to a first code when the corresponding first code is detected from the touch input, and the controller may set a second screen corresponding to a second code when the corresponding second code is consecutively detected from the touch input after detection of the first code. The controller may release the lock mode with the first screen displayed when the touch input is not sensed any more before detection of the second code. Also, the controller may release the lock mode with the second screen displayed when the touch input is not sensed any more after detection of the second code.

In accordance with one exemplary embodiment, the display unit may convert the first screen into the second screen so as to display the second screen when the second code following the first code is detected while the first screen is displayed. The display unit may display a thumbnail image of the first screen on the second screen when the first screen is converted into the second screen and the second screen is displayed. The display unit may convert the second screen into the first screen to display the first screen when a selection for the thumbnail image of the first screen is detected, and display a thumbnail image of the second screen on the first screen.

In accordance with one exemplary embodiment, the controller may set an application executable upon release of the lock mode based on the detected at least one code.

In accordance with one exemplary embodiment, the controller may authenticate a user account based on the detected at least one code. The controller may authenticate a first user account when a first code is detected from the touch input, and authenticate a second user account when a second code is consecutively detected from the touch input after detection of the first code. Functions executable in response to the authentication of the first user account may be more restricted as compared to the second user account.

In accordance with one exemplary embodiment, the at least one code may correspond to a touch pattern defined along movement of a touch point of the touch input on the display unit. The display unit may display an object for guiding defining of the touch pattern.

In accordance with one exemplary embodiment, a screen of the display unit may be divided into a plurality of touch input areas, and the controller may set the screen of the display unit based on a touch input area corresponding to the sensed touch input.

To achieve these and other advantages and in accordance with the purpose of this specification, as embodied and broadly described herein, there is provided a method for providing a user interface in a mobile terminal having a display unit, the method including sensing a touch input in a lock mode for restricting the touch input applied onto the display unit, detecting at least one code from the touch input, setting a screen of the display unit based on the detected at least one code, and releasing the lock mode with the set screen displayed when the touch input is not sensed any more.

In accordance with one exemplary embodiment, the setting of the screen of the display unit may include setting a first screen corresponding to a first code when the corresponding first code is detected from the touch input, and setting a second screen corresponding to a second code when the corresponding second code is consecutively detected from the touch input after detection of the first code.

In accordance with one exemplary embodiment, the releasing of the lock mode may include releasing the lock mode with the first screen displayed when the touch input is not sensed any more before detection of the second code, and releasing the lock mode with the second screen displayed when the touch input is not sensed any more after detection of the second code.

In accordance with one exemplary embodiment, the method may further include converting the first screen into the second screen to display the second screen when the second code following the first code is detected while the first screen is displayed, and displaying a thumbnail image of the first screen on the second screen when the second screen converted from the first screen is displayed.

In accordance with one exemplary embodiment, the method may further include converting the second screen into the first screen to display the first screen when a selection for the thumbnail image of the first screen is sensed, and displaying a thumbnail image of the second screen on the first screen.

In accordance with one exemplary embodiment, the method may further include authenticating a user account based on the detected at least one code. The authenticating of the user account may include authenticating a first user account when a first code is detected from the touch input, and authenticating a second user account when the second code is consecutively detected from the touch input after detection of the first code. Functions executable in response to the authentication of the first user account may be more restricted as compared to the second user account.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
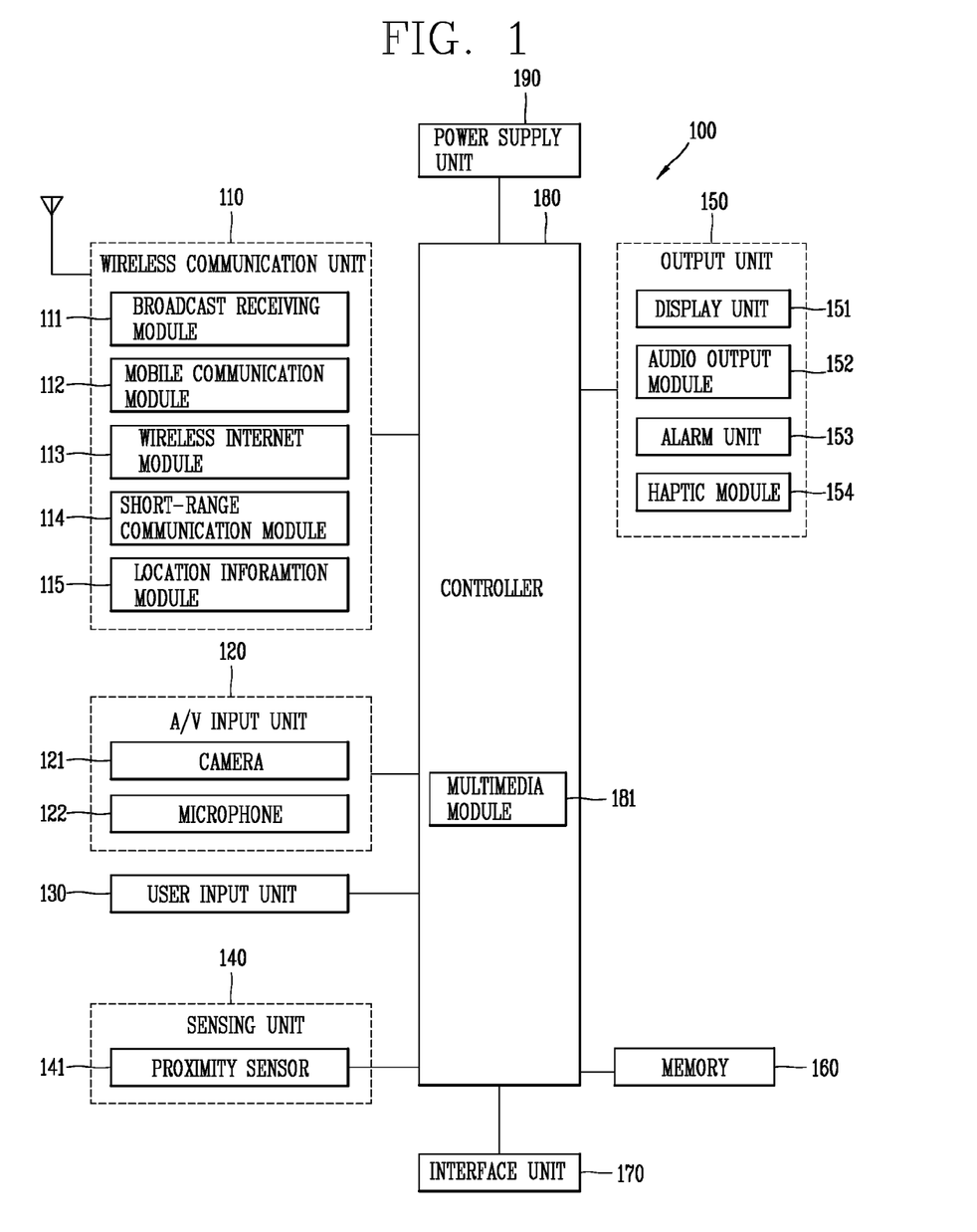
FIG. 1 is a block diagram of a mobile terminal in accordance with an embodiment of this specification.

FIG. 1 is a block diagram of a mobile terminal 100 in accordance with one embodiment. The mobile terminal 100 may include components, such as a wireless communication unit 110, an audio/video (AN) input unit 120, a user input unit 130, a sensing unit 140, an output unit 150, a memory 160, an interface unit 170, a controller 180, a power supply 190 and the like. FIG. 1 shows the mobile terminal 100 having various components, but implementing all of the illustrated components is not a requirement. Greater or fewer components may alternatively be implemented.

Hereinafter, each component 110 to 190 of the mobile terminal 100 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a location information module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast associated information may be provided via a mobile communication network, and received by the mobile communication module 112. The broadcast signal and the broadcast associated information received via the broadcast receiving module 111 may be stored in the memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless internet module 113 supports wireless internet access for the mobile terminal This module may be internally or externally coupled to the mobile terminal 100. Examples of such wireless internet access may include wireless LAN (WLAN) (Wi-Fi), wireless broadband (Wibro), worldwide interoperability for microwave access (Wimax), high speed downlink packet access (HSDPA) and the like.

The short-range communication module 114 denotes a module for short-range communications. Suitable technologies for implementing this module may include Bluetooth™, radio frequency identification (RFID), infrared data association (IrDA), ultra-wideband (UWB), Zigbee™, and the like.

The location information module 115 denotes a module for detecting or calculating a position of a mobile terminal. An example of the location information module 115 may include a global position system (GPS) module.

Referring to FIG. 1, the A/V input unit 120 is configured to provide audio or video signal input to the mobile terminal The A/V input unit 120 may include a camera 121 and a microphone 122. The camera 121 receives and processes image frames of still pictures or video obtained by image sensors in a video call mode or a capturing mode. The processed image frames may be displayed on a display unit 151. The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 can detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 can sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The sensing unit 140 may include a proximity sensor 141. Also, the sensing unit 140 may include a touch sensor to detect a touch operation on the display unit 151.

The touch sensor may be implemented as a touch film, a touch sheet, a touchpad and the like. The touch sensor can be configured to convert changes of a pressure applied to a specific part of the display 151, or a capacitance occurring from a specific part of the display 151, into electric input signals. Also, the touch sensor can be configured to sense not only a touched position and a touched area, but also a touch pressure.

Here, if the display unit 151 and a touch sensitive sensor (referred to as a touch sensor) have a layered structure therebetween, the structure may be referred to as a touch screen. The display unit 151 may be used as an input device rather than an output device.

When touch inputs are given through the touch screen, corresponding signals are transmitted to a touch controller. The touch controller processes the received signals, and then transmits corresponding data to the controller 180. Accordingly, the controller 180 can sense which region of the display unit 151 has been touched.

For a capacitance type touch screen, it may be configured to detect the proximity of a target to be sensed based on changed in electric fields in response to the proximity of the target to be sensed. This type of touch screen may be classified into the proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to output an audio signal, a video signal or an alarm signal. The output unit 150 may include a display unit 151, an audio output module 152, an alarm 153, a haptic module 154 and the like.

The display unit 151 can output information processed in the mobile terminal 100. For example, when the mobile terminal is operating in a phone call mode, the display unit 151 provides a user interface (UI) or a graphic user interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, a liquid crystal display (LCD), a thin film transistor-liquid crystal display (TFT-LCD), an organic light-emitting diode (OLED), a flexible display, a three-dimensional (3d) display, an e-ink display or the like.

Some of the displays can be configured to be transparent such that it is possible to see the exterior therethrough. These displays may be called transparent displays. A representative example of the transparent display may include a transparent organic light emitting diode (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. for instance, a plurality of the display units 151 may be arranged on one surface to be spaced apart from or integrated with each other, or may be arranged on different surfaces.

The audio output module 152 can output audio data received from the wireless communication unit 110 or stored in the memory 160, in a call-receiving mode, a call-placing mode, a recording mode, a voice recognition mode, a broadcast reception mode, and so on. The audio output module 152 can output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include a call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), random access memory (RAM), static random access memory (SRAM), read-only memory (ROM), electrically erasable programmable read-only memory (EEPROM), programmable read-only memory (PROM), magnetic memory, magnetic disk, optical disk, and the like. Also, the mobile terminal 100 may operate a web storage which performs the storage function of the memory 160 on the internet.

The interface unit 170 may generally be implemented to interface the mobile terminal with external devices. The interface unit 170 can allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio input/output (I/O) ports, video I/O ports, earphone ports, and the like.

The identification module may be configured as a chip for storing various information required to authenticate an authority to use the mobile terminal 100, which may include a user identity module (UIM), a subscriber identity module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof For a hardware implementation, the embodiments described herein may be implemented within one or more of application specific integrated circuits (ASICS), digital signal processors (DSPS), digital signal processing devices (DSPDS), programmable logic devices (PLDS), field programmable gate arrays (FPGAS), processors, controllers, micro-controllers, micro processors, other electronic units designed to perform the functions described herein, or a selective combination thereof In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, a processing method for a user input in the mobile terminal 100 will be described.

The user input unit 130 may be manipulated to allow inputting of commands for controlling operations of the mobile terminal 100, and include a plurality of first manipulation units. The plurality of manipulation units may be referred to as a manipulating portion. Such manipulating portion can employ any tactile manner that a user can touch or tap for manipulation.

Various types of visible information may be displayed on the display unit 151. Such information may be displayed in several forms, such as character, number, symbol, graphic, icon or the like, and also displayed in form of a three-dimensional image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. The output window and the input window are allocated regions for outputting or inputting of information. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted or a text displayed on the output window may be input into an application.

The display 151 or the touch pad may be scrolled to receive a touch input. A user may scroll the display 151 or the touch pad to move a cursor or pointer positioned on an object (subject), e.g., an icon or the like, displayed on the display 151. In addition, in case of moving a finger on the display 151 or the touch pad, the path of the finger being moved may be visibly displayed on the display 151, which can be useful upon editing an image displayed on the display 151.

One function of the mobile terminal may be executed in correspondence with a case where the display 151 (touch screen) and the touch pad are touched together within a preset time. An example of being touched together may include clamping a terminal body with the user's thumb and index fingers. The one function, for example, may be activating or deactivating of the display 151 or the touch pad.

Figure 2A:
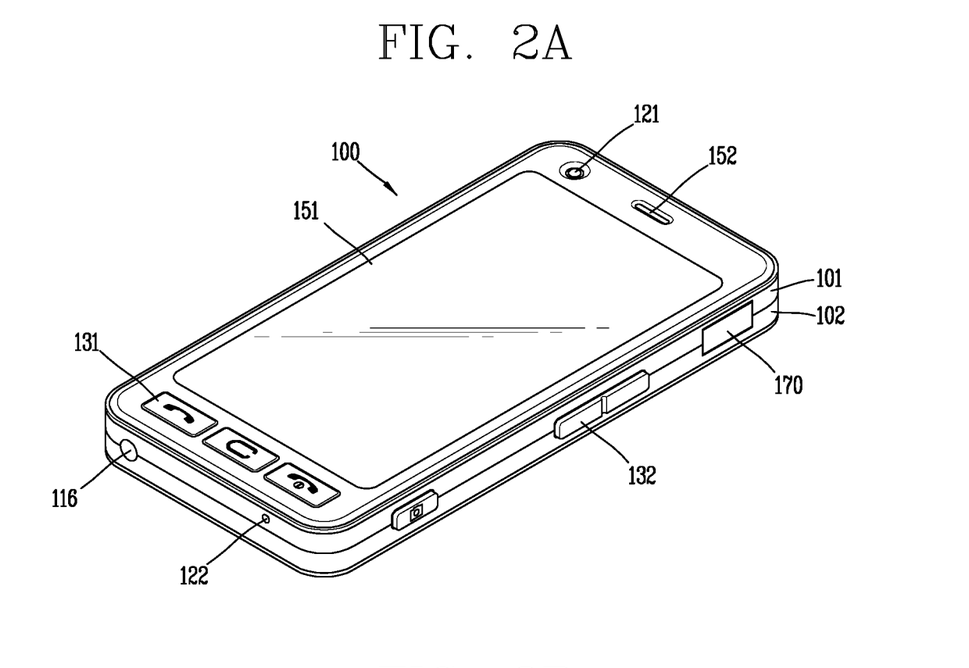
FIGS. 2A and 2B are perspective views showing an appearance of the mobile terminal.
Figure 2B:
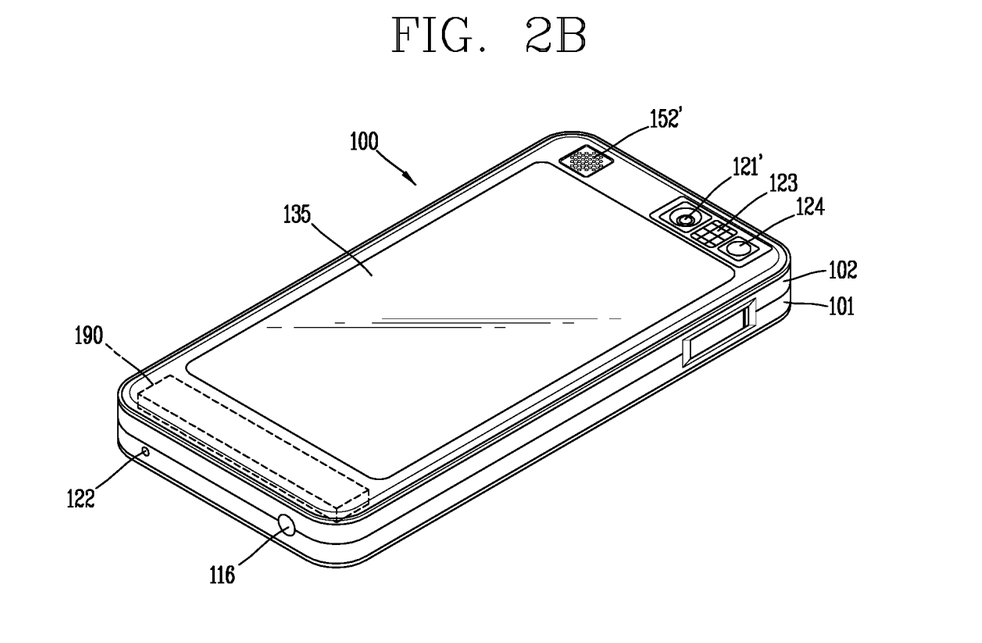

FIGS. 2A and 2B are perspective views showing an appearance of the mobile terminal FIG. 2A shows a front surface and one side surface of the mobile terminal 100, and FIG. 2B shows a rear surface and another side surface of the mobile terminal 100.

As shown in FIG. 2A, the mobile terminal 100 may include a bar-type terminal body. However, this detailed description is applicable, but not limited to, various structures, such as a slide type, a folder type, a swing type, a swivel type and the like having two or more bodies coupled to be relatively movable with each other.

The terminal body may include a case (or referred to as casing, housing, cover, etc.) defining an appearance of the mobile terminal 100. In this embodiment, the case may be divided into a front case 101 and a rear case 102. A space formed between the front and rear cases 101 and 102 accommodates various electronic components. At least one intermediate case may further be disposed between the front and the rear cases 101 and 102. Such cases may be injected using a synthetic resin or be formed of a metal, such as stainless steel (STS), titanium (Ti) or the like.

The terminal body, generally the front case 101 is shown having a display unit 151, an audio output module 152, a camera 121, a user input unit 130 (see FIG. 1), a microphone 122, an interface unit 170, and the like.

The display unit 151 may occupy most of a main surface of the front case 101. The audio output module 152 and the camera 121 may be disposed near one of both end portions of the display unit 151, and the user input unit 131 and the microphone 122 on the other end portion of the display unit 151. The user input unit 132, the interface unit 170 and the like may be disposed on side surfaces of the front and rear cases 101 and 102.

The user input unit 130 may be manipulated to allow inputting of commands for controlling operations of the mobile terminal 100, and include a plurality of first manipulation units 131, 132.

The first and second manipulation units 131, 132 may be set to allow inputting of various contents. For example, the first manipulation unit 131 may be configured to input commands such as start, end, scroll or the like, and the second manipulation unit 132 may be configured to input commands, such as a volume adjustment of sounds output from the audio output module 152, conversion of the display unit 151 into a touch recognition mode, or the like.

Referring to FIG. 2B, a rear face of the terminal body, namely, the rear case 102 may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 is useful when a user wants to capture his or her face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear face of the terminal body. The audio output module 152' can cooperate with the audio output module 152 (see FIG. 2) to provide stereo output. Also, the audio output module 152' may be configured to operate as a speakerphone.

A broadcast signal receiving antenna 116 may further be disposed at one side of the terminal body in addition to an antenna for communications, for example. The antenna 116 configuring a part of the broadcast receiving module 111 (see FIG. 1) may be retractable into the terminal body.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display unit 151, the touchpad 135 may be implemented as a light-transmissive type. Also, a rear display unit may further be mounted to output visual information on the touchpad 135. Here, information output on both the front display unit 151 and the rear display unit may be controlled by the touchpad 135.

The touchpad 135 may operate cooperative with the display unit 151 of the front case 101. The touchpad 135 may be disposed at a rear side of the display unit 151 in parallel to the display unit 151. The touchpad 135 may have a size the same as or smaller than that of the display unit 151.

In general, a lock mode of the mobile terminal 100 refers to an operation mode of limiting (restricting) a user input, such as a touch input and the like, applied onto the display unit 151. The lock mode may be released based on the restricted user input. Hereinafter, a description will be given of releasing (unlocking) the lock mode in accordance with the embodiments of the present disclosure.

Figure 3:
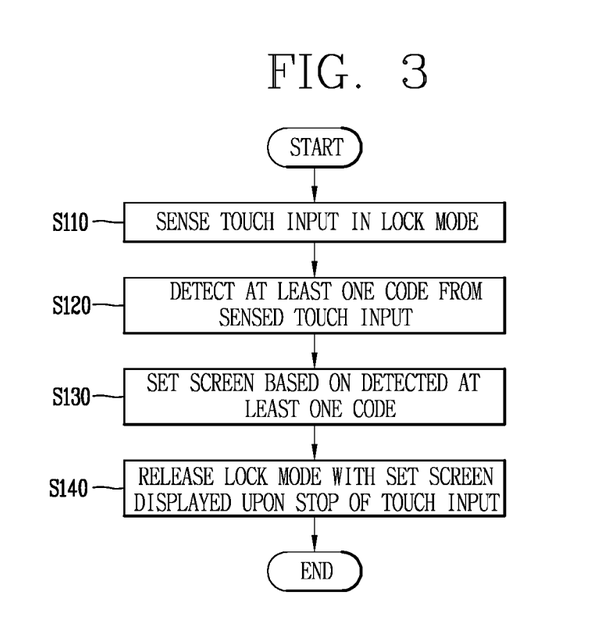
FIG. 3 is a flowchart showing a method for providing a user interface in a mobile terminal in accordance with one embodiment.

FIG. 3 is a flowchart showing a method for providing a user interface in a mobile terminal in accordance with one embodiment. As shown in FIG. 3, a user interface providing method includes sensing a touch input applied onto the display unit (S110). For example, a tap gesture, a drag gesture, a flick gesture and the like may be sensed as the touch input.

The method also includes detecting at least one code from the sensed touch input (S120). For example, while a drag gesture is applied, a plurality of codes may be detected from the drag gesture. The detected code may correspond to a touch pattern defined responsive to movement of a touch point on the display unit 151. Also, the detected code may correspond to a password in a combined form of characters, numbers, symbols and the like.

The method includes setting a screen of the display unit based on the detected at least one code (S130). To this end, mapping information between a plurality of codes and a plurality of screens may be stored in the memory 160 in advance. When the detected code from the touch input matches one of the plurality of codes, a screen corresponding to the matched code can be set by referring to the stored mapping information. The set screen can be displayed in a lock mode.

In accordance with the embodiment, a user account may be authenticated based on the at least one code detected. For this purpose, similar to the aforementioned method, a user account corresponding to a matched code can be authenticated with reference to mapping information between a plurality of codes and a plurality of user accounts. It may be possible to decide rights to use functions of the mobile terminal according to the authenticated user account. For example, functions executable upon authentication of a guest account may be more restricted than an administrator account.

The method then includes releasing the lock mode with the set screen displayed when the touch input is not sensed any more (S140). For example, the lock mode may be maintained while the drag gesture is sensed, and released when the drag gesture is stopped. Here, the lock mode may be released with a screen displayed, which corresponds to at least one touch pattern formed by the drag gesture, namely, at least one code.

As aforementioned, with the configuration of the mobile terminal, when the lock mode is released, different control modes (i.e., control modes according to different screen settings and user account authentication) can be executed based on the at least one code detected in the lock mode. Accordingly, even if many users use one mobile terminal, their individual privacies can be protected.

Also, when a plurality of codes are consecutively detected from one touch input, a screen setting and a user account authentication are executed in a sequential manner, so a control mode after release of the lock mode can be selected, thereby improving user convenience.

Figure 4:
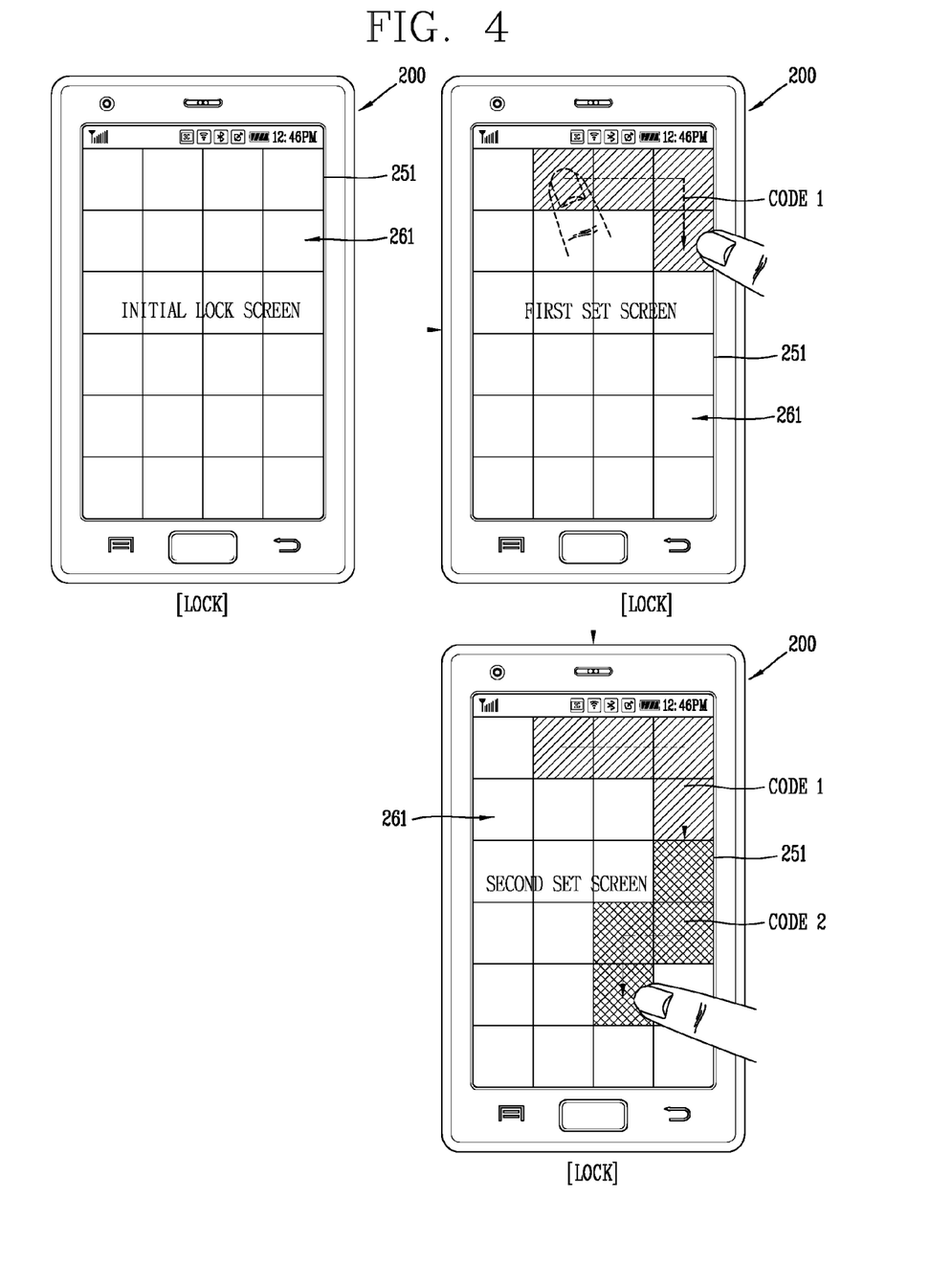
FIGS. 4 to 9 are overviews showing operations of the mobile terminal according to the user interface providing method of FIG. 3.

FIGS. 4 to 9 are overviews showing operations of a mobile terminal 200 according to the user interface providing method of FIG. 3. In particular, FIG. 4 shows a screen conversion operation of a display unit 251 in a lock mode. A sensing unit 140 may sense a touch input, for example, a drag gesture applied onto the display unit 251 in the lock mode. A detecting unit (e.g., controller 180) can detect first and second codes CODE1 and CODE2 from the sensed touch input. Here, the first and second codes CODE1 and CODE2 correspond to first and second touch patterns defined by the drag gesture.

The display unit 251 displays a guide object 261 for guiding the definition of the touch patterns. The guide object 261, as shown in FIG. 4, may include a plurality of grid cells.

When the first code CODE1 is detected in the lock mode, the controller 180 sets a first screen corresponding to the first code CODE1. Here, the display unit 251 may convert an initial lock screen into the first screen to display the first screen.

When the second code CODE2 following the first code CODE1 is detected while the touch input is continuously sensed, the controller 180 sets a second screen corresponding to the second code CODE2. Here, the display unit 251 converts the first screen into the second screen to display the second screen.

In accordance with the embodiment, the second screen may be set based on a combination of consecutively detected codes and a detected order thereof. For example, when a third code other than the first code is detected prior to the second code, a screen different from the second screen may be set. In other words, one screen does not have a one-to-one correspondence with one code, but may be set based on a combination of a plurality of codes.

Figure 5:
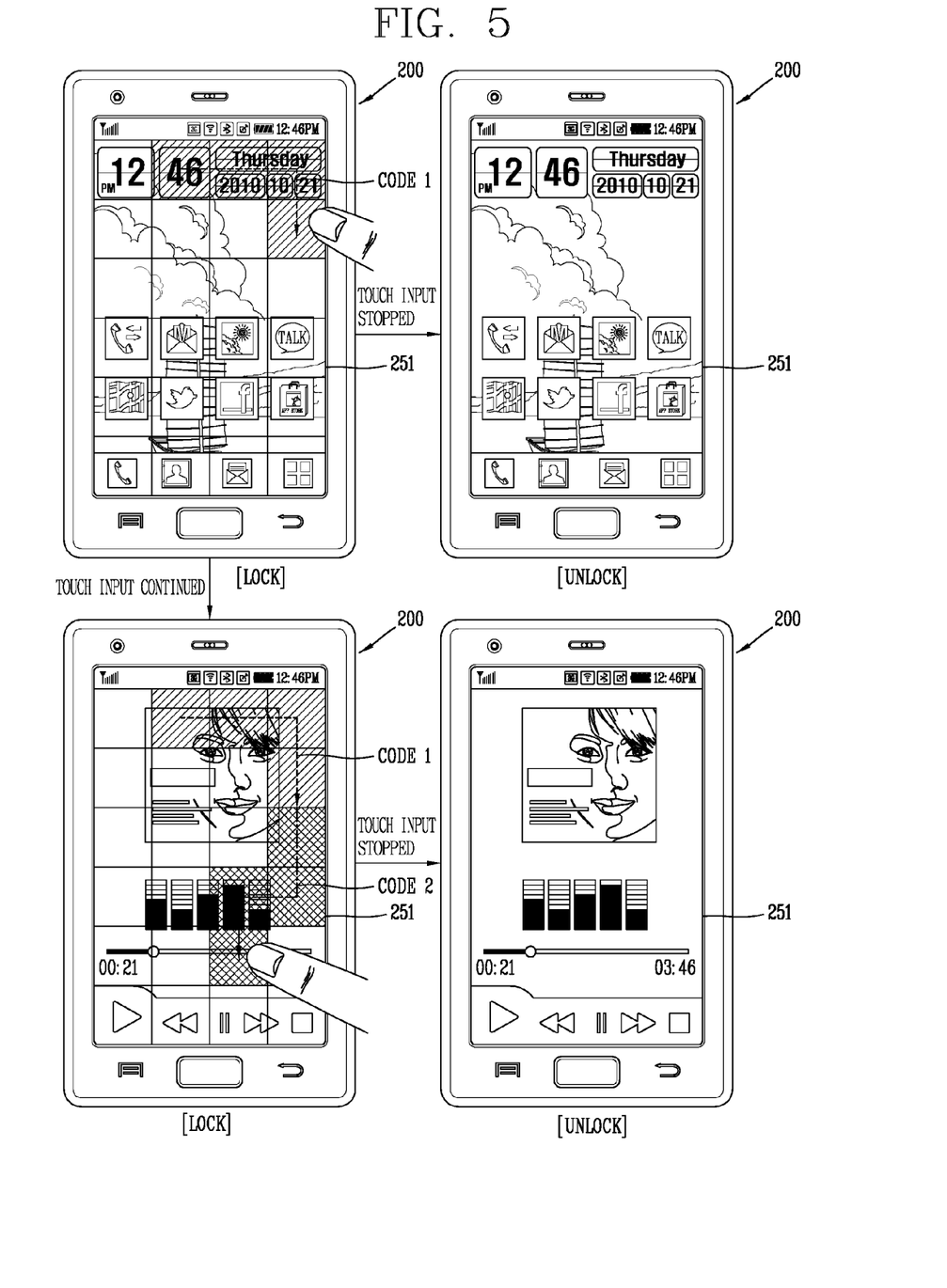

Referring to FIG. 5, when the first code CODE1 is detected responsive to a touch input in a lock mode, the display unit 251 displays a home screen, which includes icons, widgets and the like, as a first screen corresponding to the first code CODE1.

When the touch input is not sensed any more before a second code CODE2 is detected after detection of the first code CODE1, the controller 180 releases the lock mode with the first screen displayed.

On the contrary, when the touch input is continued in the lock mode and the second code CODE2 is detected from the touch input, the display unit 251 displays an execution screen of an application (for example, an execution screen of MP3 player) as a second screen corresponding to the second code CODE2. This indicates that the application corresponding to the second code CODE2 is executable in response to the detection of the second code CODE2. Here, unless the lock mode is released, a control command for an application is blocked.

When the touch input is not sensed any more after the second code CODE2 following the first code CODE1 is detected, the controller 180 releases the lock mode with the second screen displayed. Meanwhile, screens set in response to the detection of codes are limited to the aforementioned examples, but change into various forms.

Figure 6:
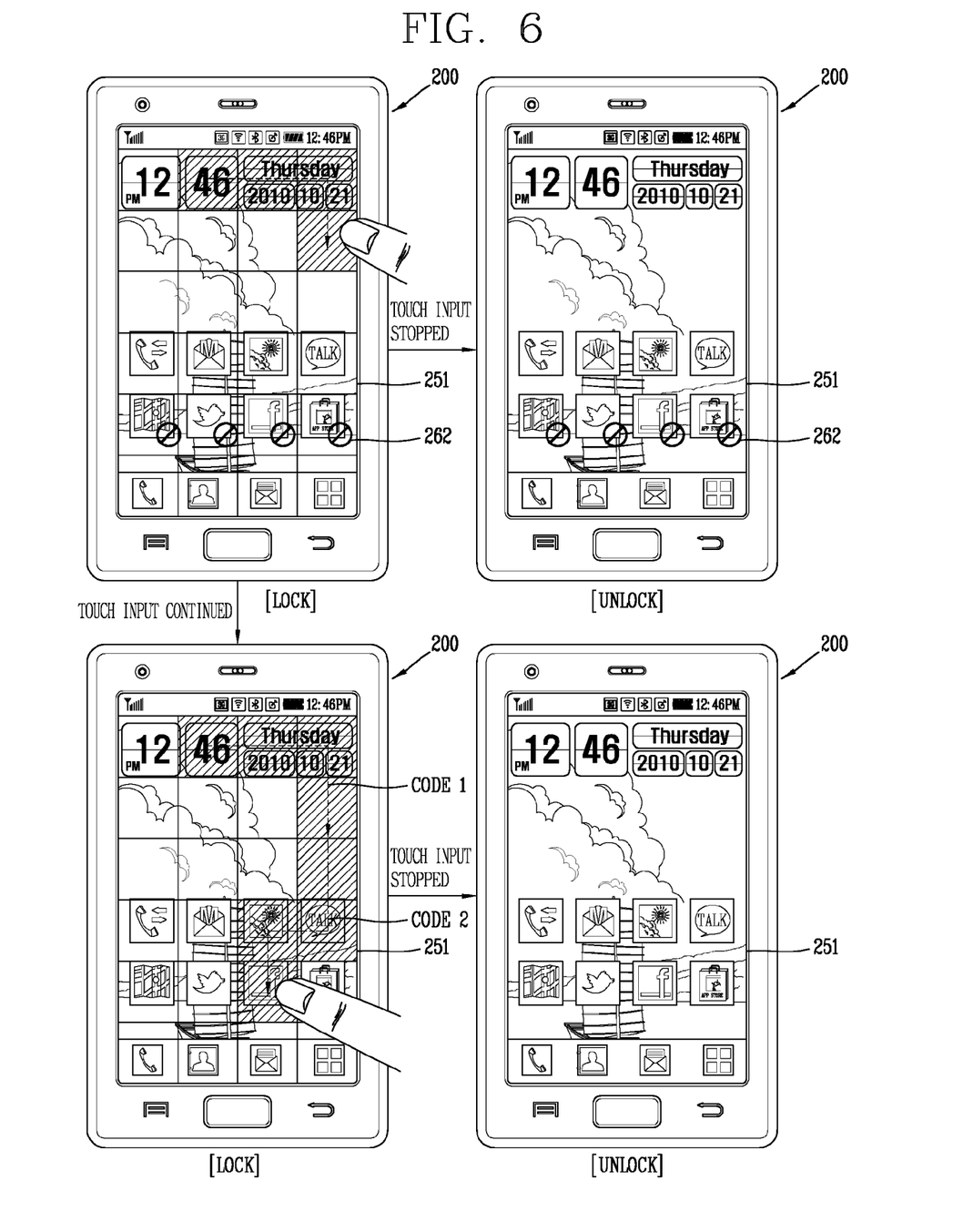

Referring to FIG. 6, the controller 180 can set functions executable upon release of a lock mode based on at least one code detected from a touch input in the lock mode. In more detail, the controller 180 can authenticate a user account corresponding to at least one code detected from a touch input in a lock mode, and set rights to use functions based on the authenticated user account.

For example, when a first code CODE1 is detected from a touch input in the lock mode, the controller 180 can authenticate a first user account. The controller 180 may restrict an execution of some of applications based on the first user account. Here, the display unit 251 may display state information 262 indicating execution-restricted applications. Alternatively, the display unit 251 may not display an icon corresponding to the execution-restricted application or display the corresponding icon to be distinguished from other icons.

When the touch input is not sensed any more before a second code CODE2 is detected after the detection of the first code CODE1, the controller 180 releases the lock mode while maintaining a user environment set according to the first user account.

On the contrary, while the touch input is continued in the lock mode, when the second code CODE2 is detected from the touch input, the controller 180 can authenticate a second user account. The controller 180 releases the execution restriction for the applications based on the second user account. Here, the display unit 251 may not display the state information 262 anymore indicating the execution-restricted applications.

When the touch input is not sensed any more after the second code CODE2 following the first code CODE1 is detected, the controller 180 releases the lock mode with maintaining a user environment set according to the second user account.

In accordance with this embodiment, a user who merely knows the first code CODE1 may be more restricted from using applications than users who know both the first and second codes CODE1 and CODE2.

Figure 7:
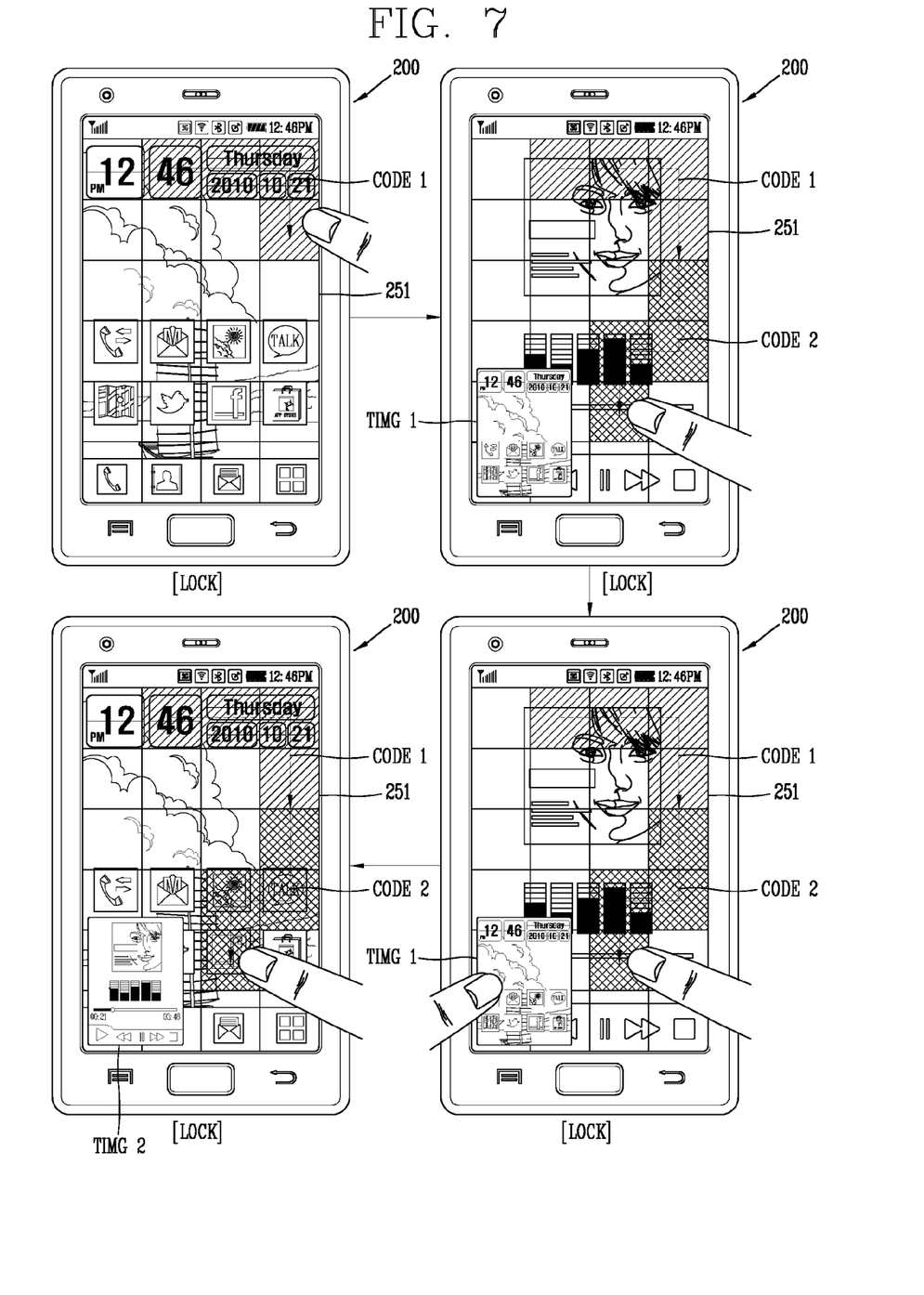

Referring to FIG. 7, when a second code CODE2 following a first code CODE1 is detected from a touch input while a first screen (for example, a home screen) is displayed, the display unit 251 converts the first screen into a second screen to display the second screen (for example, an execution screen of MP3 player). Here, the second screen may include a thumbnail image TIMG1 of the first screen. In other words, when the first screen is converted into the second screen and the second screen is displayed, the display unit 251 displays the thumbnail image TIMG1 of the first screen on the second screen.

Afterwards, when a selection for the thumbnail image TIMG1 of the first screen is detected, the display unit 251 converts the second screen back into the first screen so as to display the first screen again, and displays a thumbnail image TIMG2 of the second screen on the first screen. Similarly, when a selection for the thumbnail image TIMG2 of the second screen is detected, the display unit 251 converts the first screen into the second screen to display the second screen.

In accordance with the embodiment, the thumbnail images TIMG1 and TIMG2 used for screen conversion may be selected by a multi-touch input. For example, when the multi-touch input includes first and second touch inputs, codes may be input by the first touch input and thumbnail images TIMG1 and TIMG2 may be selected by the second touch input.

In accordance with the embodiment, while a plurality of screens are sequentially displayed as codes are consecutively detected, a screen, which has been displayed once, may be displayed again using a thumbnail image corresponding to each screen.

Figure 8:
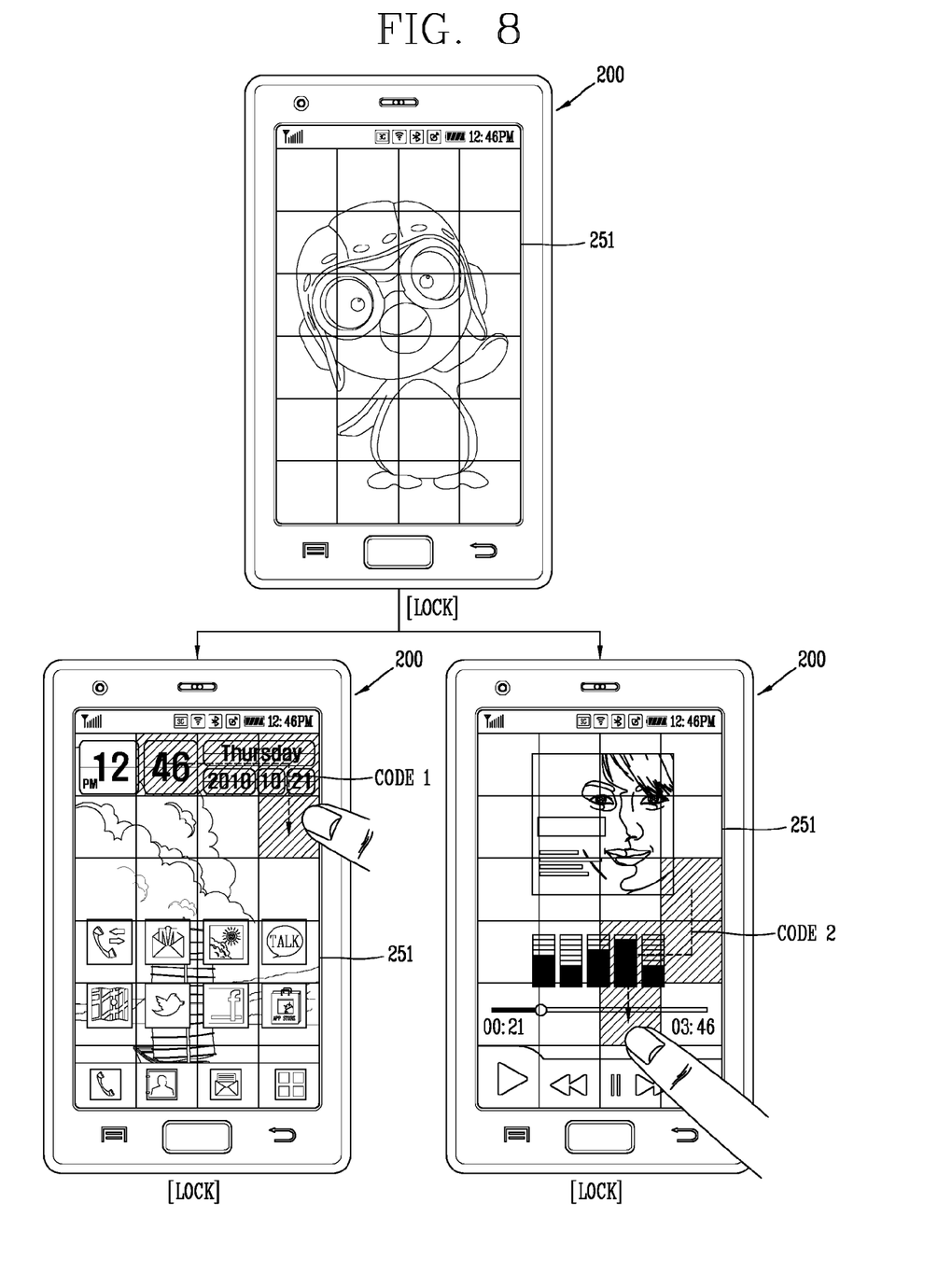
Figure 9:
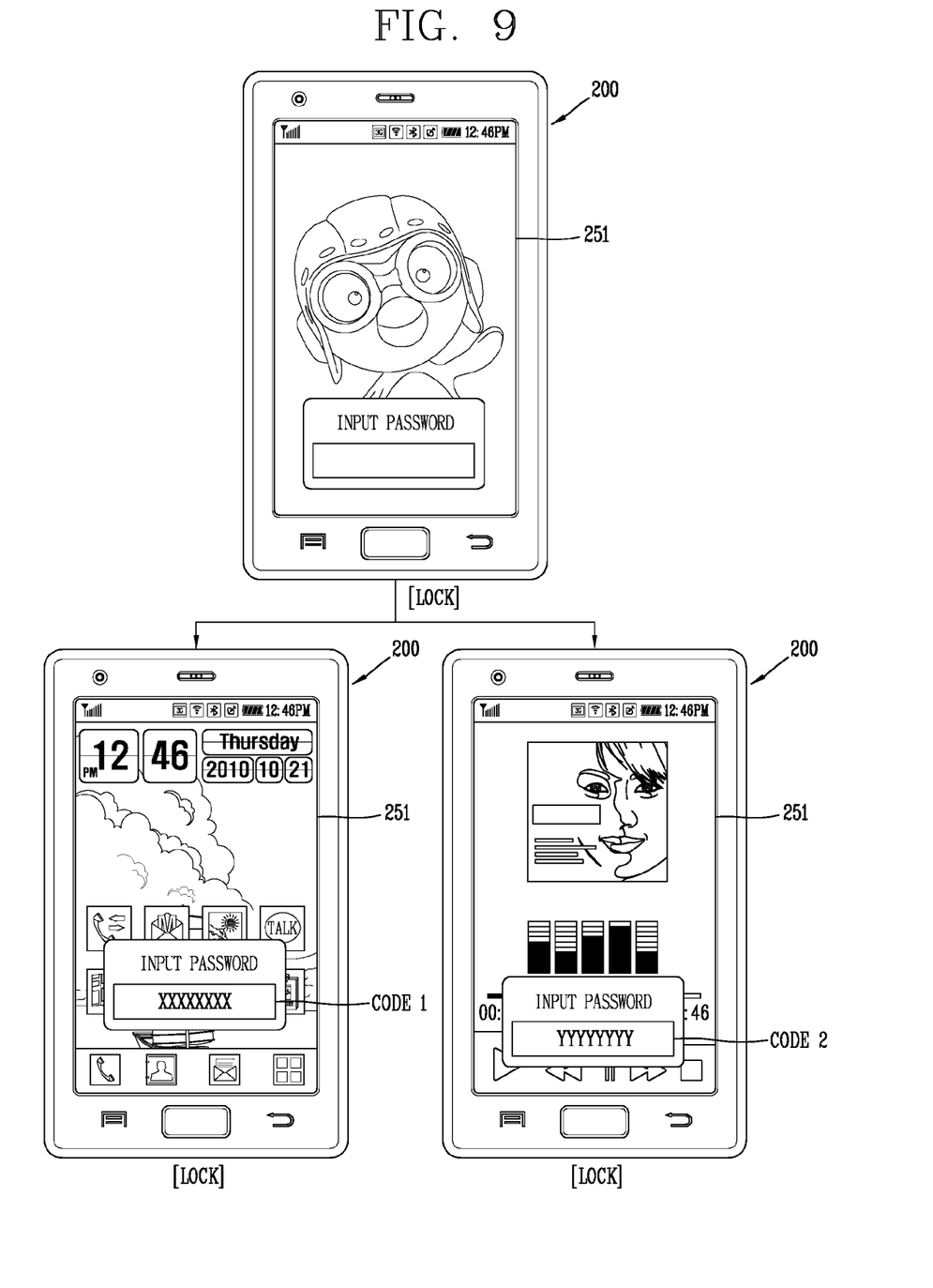

Next, FIG. 8 shows a screen conversion operation based on a touch pattern defined by a touch input as a code detected in a lock mode. FIG. 9 shows a screen conversion operation based on a password as a code detected in the lock mode. For input of the password, an input window, a virtual keypad and or the like may be displayed on an initial lock screen.

Referring to FIG. 8, when a first touch pattern CODE1 is detected while an initial lock screen is displayed, the controller 180 sets a first screen corresponding to the first touch pattern CODE1 and the display unit 251 converts and displays the initial lock screen into the set first screen. When the touch input is stopped after the first touch pattern CODE1 is detected, the controller 180 releases the lock mode with the first screen displayed.

On the contrary, when a second touch pattern CODE2 is detected while the initial lock screen is displayed, the controller 180 sets a second screen corresponding to the second touch pattern CODE2, and the display unit 251 converts and displays the initial lock screen into the set second screen. When the touch input is stopped after the second touch pattern CODE2 is detected, the controller 180 releases the lock mode with the second screen displayed.

As such, touch patterns can be detected from different touch inputs. Accordingly, an initial lock screen can be converted into a screen corresponding to a touch pattern detected from a touch input. A lock mode can also be released in response to termination of the touch input with the converted screen displayed.

Referring to FIG. 9, similarly, when a first password CODE1 is input while an initial lock screen is displayed, the controller 180 sets a first screen corresponding to the first password CODE1, and the display unit 251 converts and displays the initial lock screen into the set first screen. When the first password CODE1 is not input anymore, the controller 180 releases the lock mode with the first screen displayed.

On the contrary, when a second password CODE2 is detected while the initial lock screen is displayed, the controller 180 sets a second screen corresponding to the second password CODE2, and the display unit 251 converts and displays the initial lock screen into the set second screen. When the second password CODE2 is not input anymore, the controller 180 releases the lock mode with the second screen displayed.

As such, when a password is input in a lock mode, an initial lock screen is converted into a screen corresponding to the input password, and the lock mode is released with the converted screen displayed.

Figure 10:
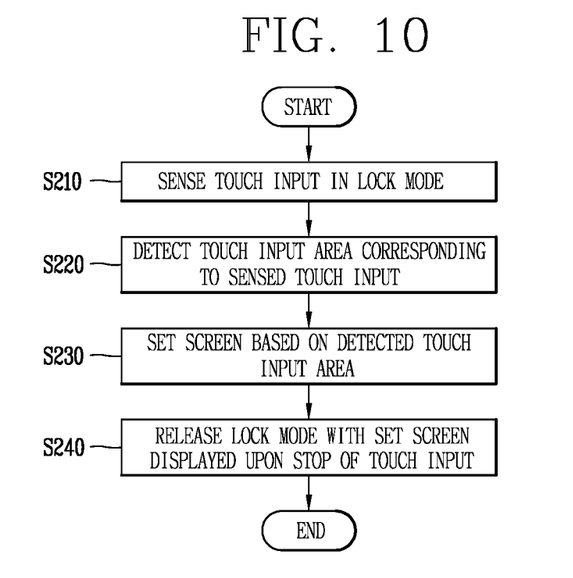
FIG. 10 is a flowchart showing a method for providing a user interface in a mobile terminal in accordance with another embodiment.

Next, FIG. 10 is a flowchart showing a method for providing a user interface in the mobile terminal in accordance with another embodiment. As shown in FIG. 10, a user interface providing method, as aforementioned with reference to FIG. 3, includes sensing a touch input applied onto the display unit 151 in a lock mode (S210). Here, a screen of the display unit 151 may include a plurality of touch input areas.

The method also includes detecting a touch input area corresponding to the sensed touch input (S220), setting a screen of the display unit 151 based on the detected touch input area of the touch input areas (S230), and releasing a lock screen with the set screen displayed when the touch input is not sensed anymore (S240).

Figure 11:
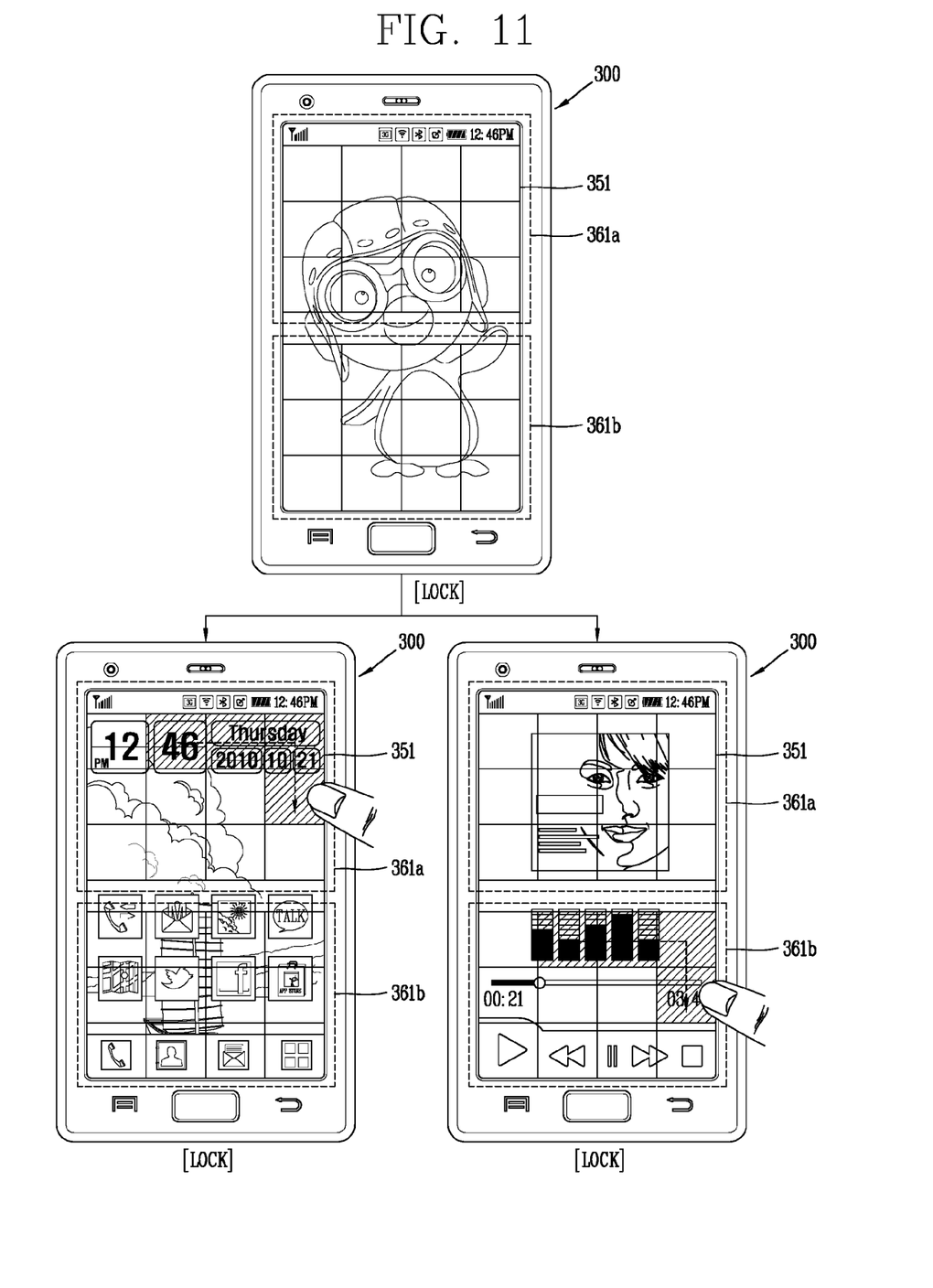
FIG. 11 is an overview showing an operation of the mobile terminal according to the user interface providing method of FIG. 10.

FIG. 11 is an overview showing an operation of a mobile terminal 300 according to the user interface providing method of FIG. 10. As shown in FIG. 11, a screen of a display unit 351 includes first and second touch input areas 361a and 361b. The first and second touch input areas 361a and 361b occupy upper and lower portions of the screen. However, the configuration of the touch input areas is not limited to that but includes different forms.

When a touch input is sensed on the first touch input area 361a while an initial lock screen is displayed, the controller 180 sets a first screen corresponding to the first touch input area 361a, and the display unit 351 converts and displays the initial lock screen into the set first screen. When the touch input is not sensed anymore, the controller 180 releases a lock mode with the first screen displayed.

On the contrary, when a touch input is sensed on the second touch input area 362A while the initial lock screen is displayed, the controller 180 sets a second screen corresponding to the second touch input area 362A, and the display unit 351 converts and displays the initial lock screen into the set second screen. When the touch input is not sensed anymore, the controller 180 releases the lock mode with the second screen displayed.

Here, the same code can be detected from the touch inputs sensed on the first and second touch input areas 361a and 361b, respectively. In other words, touch inputs sensed respectively on different touch input areas can define the same touch pattern.

The aforementioned embodiment may be similarly applied to authenticating of a user account and setting of functions to be executable upon release of a lock mode, as well as the screen setting.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication unit configured to wirelessly communicate with at least one other terminal;
a touch screen configured to display a lock screen in a lock mode; and
a controller configured to:
receive a drag touch input via the touch screen while the mobile terminal is in the lock mode and displaying the lock screen;
detect a first touch code and a second touch code from the drag touch input, said first touch code corresponding to a first portion of the drag touch input and said second touch code corresponding to a second portion of the drag touch input,
change the lock screen into a first screen in response to detecting the first touch code from the drag touch input while the lock mode is maintained,
change the first screen into a second screen in response to detecting the second touch code from the drag touch input after the first touch code is detected from the drag touch input and the first screen is displayed on the touch screen while the lock mode is maintained, and
release the lock mode with the first screen or the second screen when the drag touch input is no longer received via the touch screen,
wherein:
the controller is further configured to release the lock mode with the first screen when the drag touch input no longer applied to the touch screen before the second touch code is detected from the drag touch input, and
the controller is further configured to release the lock mode with the second screen when the drag touch input no longer applied to the touch screen after the second touch code is detected from the drag touch input.

2. The terminal of claim 1, wherein the controller is further configured to display a first thumbnail image of the first screen on the second screen when the second screen is displayed after the first screen.

3. The terminal of claim 2, wherein the controller is further configured to:
detect a selection of the first thumbnail image of the first screen, redisplay the first screen based on the selection of the first thumbnail image, and display a second thumbnail image of the second screen on the first screen.

4. The terminal of claim 1, wherein the controller is further configured to execute a predetermined application upon release of the lock mode based on the detected first code.

5. The terminal of claim 1, wherein the controller is further configured to authenticate a user account based on the detected first code.

6. The terminal of claim 1, wherein the controller is further configured to:
authenticate a first user account when the first code is detected from the touch input, and
authenticate a second user account when the second code is consecutively detected after the first code.

7. The terminal of claim 6, wherein functions executable in response to the authentication of the first user account are more restricted than functions executable in response to the authentication of the second user account.

8. The terminal of claim 1, wherein the controller is further configured to display a guide on the touch screen for guiding the input of the touch pattern.

9. The terminal of claim 1, further comprising:
a memory configured to store data corresponding the first and second screens mapped to the first and second codes, respectively.

10. A method of controlling a mobile terminal, the method comprising:
displaying, on a touch screen, a lock screen indicating the mobile terminal is in a lock mode;
receiving a drag touch input via the touch screen while the mobile terminal is in the lock mode and displaying the lock screen;
detecting a first touch code and a second touch code from the drag touch input, said first touch code corresponding to a first portion of the drag touch input and said second touch code corresponding of the drag touch input;
changing the lock screen into a first screen in response to detecting the first touch code from the drag touch input while the lock mode is maintained;
changing the first screen into a second screen in response to detecting the second touch code from the drag touch input after the first touch code is detected from the drag touch input and the first screen is displayed on the touch screen while the lock mode is maintained; and
releasing the lock mode with the first screen or the second screen when the drag touch input is no longer received via the touch screen,
wherein:
the lock mode is released with the first screen when the drag touch input no longer applied to the touch screen before the second touch code is detected from the drag touch input, and
the lock mode is released with the second screen when the drag touch input no longer applied to the touch screen after the second touch code is detected from the drag touch input.

11. The method of claim 10, further comprising:
displaying, via the controller, a first thumbnail image of the first screen on the second screen when the second screen is displayed after the first screen;
detecting, via the controller, a selection of the first thumbnail image of the first screen;
redisplaying, via the controller, the first screen based on the selection of the first thumbnail image; and
displaying, via the controller, a second thumbnail image of the second screen on the first screen.

12. The method of claim 10, further comprising:
executing, via the controller, a predetermined application upon release of the lock mode based on the detected first code.

13. The method of claim 10, further comprising:
authenticating, via the controller, a first user account when the first code is detected from the touch input; and
authenticating, via the controller, a second user account when the second code is consecutively detected after the first code,
wherein functions executable in response to the authentication of the first user account are more restricted than functions executable in response to the authentication of the second user account.

14. The method of claim 10, further comprising:
displaying, via the controller, a guide on the touch screen for guiding the input of the touch pattern.

* * * * *